(12) United States Patent
Yamamoto

(10) Patent No.: US 8,687,223 B2
(45) Date of Patent: Apr. 1, 2014

(54) IMAGE PROCESSING APPARATUS AND IMAGE PROCESSING METHOD UTILIZING EFFICIENT MEMORY REGIONS

(75) Inventor: Ryouji Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 755 days.

(21) Appl. No.: 12/404,445

(22) Filed: Mar. 16, 2009

(65) Prior Publication Data

US 2009/0237735 A1    Sep. 24, 2009

(30) Foreign Application Priority Data

Mar. 18, 2008 (JP) ................ 2008-069201

(51) Int. Cl.
*G06K 15/00* (2006.01)
*G06F 3/12* (2006.01)

(52) U.S. Cl.
USPC .............. 358/1.16; 358/1.15; 358/1.14

(58) Field of Classification Search
None
See application file for complete search history.

(56) References Cited

U.S. PATENT DOCUMENTS

| | | | | |
|---|---|---|---|---|
| 5,212,566 | A * | 5/1993 | U et al. ........................ | 358/444 |
| 6,570,667 | B1 | 5/2003 | Hattori et al. | |
| 6,707,571 | B1 * | 3/2004 | Kurashina ................... | 358/1.18 |
| 7,298,505 | B2 * | 11/2007 | Ueda ............................ | 358/1.14 |
| 2003/0093445 | A1 * | 5/2003 | Schick et al. ................ | 707/205 |
| 2003/0182353 | A1 * | 9/2003 | Flanigan et al. ............. | 709/104 |
| 2005/0180643 | A1 * | 8/2005 | Okada .......................... | 382/232 |
| 2006/0034547 | A1 * | 2/2006 | Nakazono et al. ........... | 382/298 |
| 2008/0052484 | A1 * | 2/2008 | Ohno ............................ | 711/171 |
| 2008/0091909 | A1 * | 4/2008 | Hwang ......................... | 711/170 |

FOREIGN PATENT DOCUMENTS

| | | |
|---|---|---|
| JP | 7-273957 | 10/1995 |
| JP | 11-205526 | 7/1999 |
| JP | 2003-341156 | 12/2003 |
| JP | 2007-164552 | 6/2007 |

OTHER PUBLICATIONS

English translation of Japanese Office Action issued Nov. 1, 2011 in Japan Patent Application No. 2008-069201 (Dec. 16, 2011 Information Disclosure Statement).

* cited by examiner

*Primary Examiner* — Ming Hon
(74) *Attorney, Agent, or Firm* — Oblon, Spivak, McClelland, Maier & Neustadt, L.L.P.

(57) ABSTRACT

An image processing method includes storing image data in a storage unit; setting a common region in the storage unit, the common region including an input image data storage region and an output image data storage region; sequentially storing the image data that is compressed at a preset compression ratio in the input image data storage region; sequentially expanding the image data stored in the input image data storage region; temporarily storing the expanded image data in the output image data storage region; and controlling allocation of the input image data storage region and the output image data storage region in the common region. In an embodiment, the allocation of the input image data storage region and the output image data storage region in the common region may be determined depending on the compression ratio of the sequentially inputted image data.

17 Claims, 9 Drawing Sheets

IMAGE PROCESSING APPARATUS AND IMAGE PROCESSING METHOD UTILIZING EFFICIENT MEMORY REGIONS

BACKGROUND OF THE INVENTION

1. Field of the Invention

The present invention generally relates to image processing apparatuses, such as copiers, printers, facsimile machines, and multifunctional peripherals. The present invention also relates to image processing methods.

2. Description of the Related Art

In a conventional image processing apparatus, such as a multifunctional peripheral, a processing region is ensured in a memory for each of multiple functions, such as copying, printing, and scanning functions individually. The individual function then performs data input/output control using its allocated processing region (see Japanese Laid-Open Patent Application No. 2003-341156, for example).

FIG. 1 shows a diagram illustrating how a memory in a conventional image processing apparatus is partitioned into plural processing regions for different functions. As shown, the memory is divided into four regions; namely, a copied image processing region; a printed image processing region; a scanner image processing region; and a program control region. Input and output of image data is controlled by using the individually allocated regions. In this way, contention among the individual functions for memory is prevented when the copy, print, and scanner functions are operated in a multiplex mode.

In a conventional color multifunctional peripheral, the copy function may be allocated about 300 MB, the printer function may be allocated about 150 MB, and the scanner function may be allocated about 280 MB of memory. When a memory size for program control is included, the total memory size may amount to as much as 1 GB, thus increasing cost.

Furthermore, image data handled by conventional information processing apparatuses is basically non-compressed raw data, where the image data is stored in a memory using a compression method specifically adapted for the particular image processing apparatus. Thus, the stored image data cannot be utilized except by the particular image processing apparatus, although the dedicated compression method may increase the image processing speed in the particular image processing apparatus.

A technology has been proposed whereby data is compressed using a standard compression technology, such as by JPEG or PDF, so that the stored data can be utilized by an externally connected personal computer or the like.

However, when image data read by a scanner is compressed at a low compression ratio, the data may not fit within a scanner image processing region that is provided in advance. As a result, the scanned image data may write over printed image data stored in an adjacent printed image processing region that is currently printing, resulting in an abnormal image (such as a destroyed image) in the printed result.

With reference to FIGS. 2A, 2B, and 2C, development of an abnormal image in a conventional image processing apparatus is described.

The figures show a memory that is partitioned into plural input image processing regions ($V_{IN}$) and plural output image processing regions ($V_{OUT}$), with a common region (C) placed between $V_{IN}$ and $V_{OUT}$. When a manuscript is read, in order to save memory and increase image data transfer rate, image data that is read is compressed and transferred to the input image processing regions $V_{IN}$. The compressed image data is then expanded and transferred to the output image processing regions $V_{OUT}$.

With reference to FIG. 2A, when image data compressed at a standard compression ratio is stored in the input image processing regions $V_{IN}$, image data 50 for page 1 that has been read with a scanner is compressed at the standard compression ratio and then transferred to the input image processing region $V_{IN}$ 51 where it is stored. The compressed image data is then expanded and restored, and then stored in the output image processing region $V_{OUT}$ 52. The restored image data is thereafter transferred to an engine portion for printing.

With reference to FIG. 2B, image data 53 for page 2 that has been read with the scanner is compressed at the standard compression ratio. The compressed image data is then transferred to the input image processing region $V_{IN}$ 54 where it is stored, avoiding the input image processing region $V_{IN}$ 51 where the previous image data is already stored. The input image processing region $V_{IN}$ 51 is avoided because it is possible that the previous image data is being expanded.

The compressed image data stored in the input image processing region $V_{IN}$ 54 is expanded and restored, and is then stored in the output image processing region $V_{OUT}$ 55, avoiding the output image processing region $V_{OUT}$ 52 where the previous image data is already stored (for the previous image data may be printing). The image data stored in the output image processing region $V_{OUT}$ 55 is then transferred to the engine portion for printing.

In this case, no abnormal image develops in the printed result.

However, as shown in FIG. 2C, if image data 53 for page 2 that has been read with the scanner is compressed at a compression ratio lower than the standard compression ratio, the image data 53 may overflow from the allocated input image processing region $V_{IN}$ 54 and enter the output image processing region $V_{OUT}$ 52 where the image data for page 1 is already stored, through the common region C, as indicated at 56. If this happens, an abnormal image develops during the printing of the print data for page 1.

SUMMARY OF THE INVENTION

It is a general object of the present invention to provide an image processing apparatus and an image processing method by which one or more of the aforementioned problems of the related art are eliminated.

A more specific object is to provide an image processing apparatus and an image processing method by which memory regions are utilized efficiently so that image data can be inputted to or outputted from memory requiring a small memory size, thereby preventing the development of an abnormal image in output image data due to input image data.

According to one aspect of the present invention, an image processing apparatus includes a storage unit configured to store image data and a control unit. The control unit ensures a common region in the storage unit, the common region including an input image data storage region and an output image data storage region.

The image data that is compressed at a preset compression ratio and sequentially inputted is stored in the input image data storage region. The image data stored in the input image data storage region is sequentially expanded and temporarily stored in the output image data storage region for output.

The control unit controls allocation of the input image data storage region and the output image data storage region in the common region.

According to another aspect of the present invention, an image processing method includes storing image data in a storage unit and setting a common region in the storage unit. The common region includes an input image data storage region and an output image data storage region. The image data that is compressed at a preset compression ratio is sequentially stored in the input image data storage region. The image data stored in the input image data storage region is sequentially expanded, and temporarily stored in the output image data storage region. The input image data storage region and the output image data storage region in the common region are controlled.

BRIEF DESCRIPTION OF THE DRAWINGS

These and other objects, features and advantages of the invention will be apparent to those skilled in the art from the following detailed description of the invention, when read in conjunction with the accompanying drawings in which.

DETAILED DESCRIPTION OF THE PREFERRED EMBODIMENTS

Figure 1:
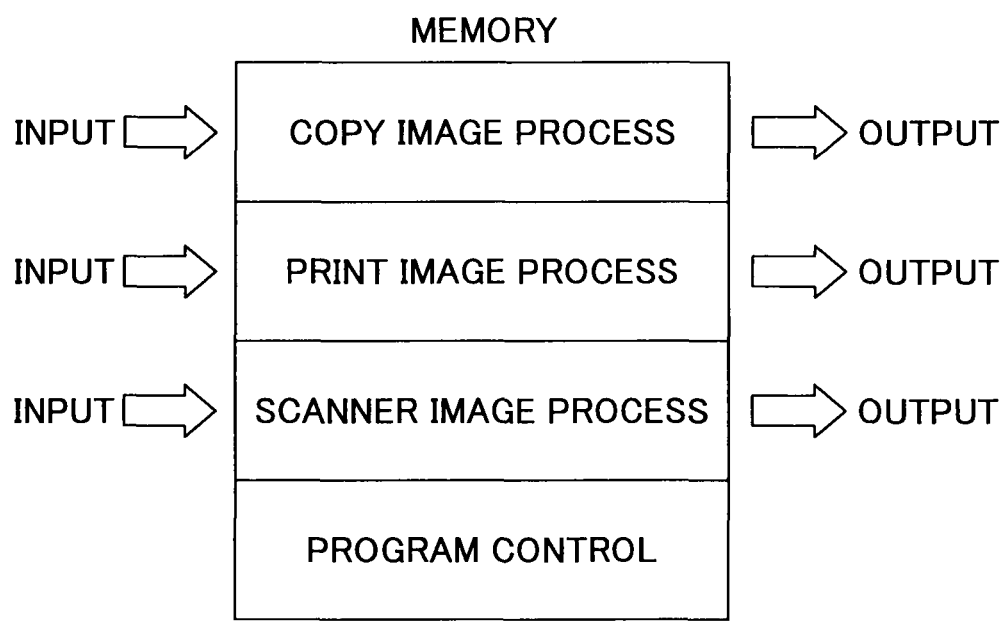
FIG. 1 shows a diagram illustrating how a memory in a conventional image processing apparatus is used by plural functions.
Figure 2A:
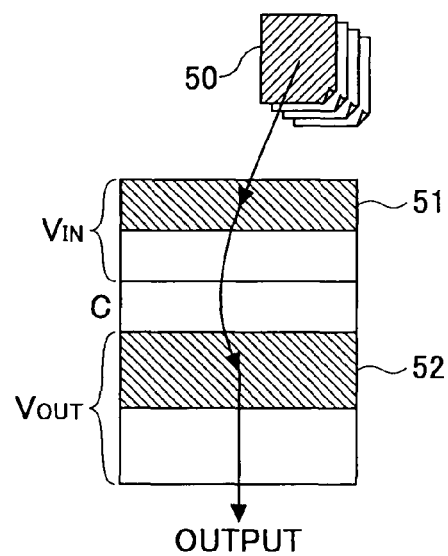
FIGS. 2A to 2C illustrate how an abnormal image develops in the conventional image processing apparatus.
Figure 2B:
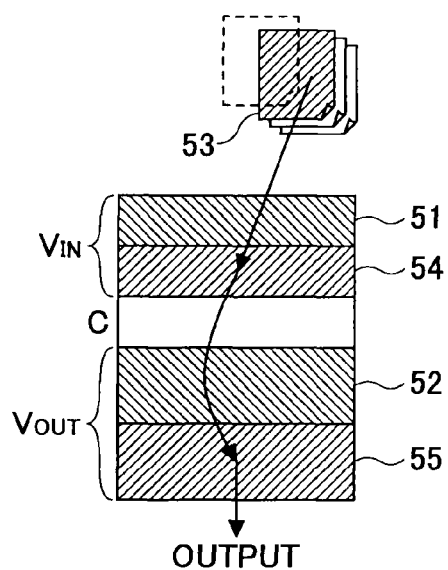
Figure 2C:
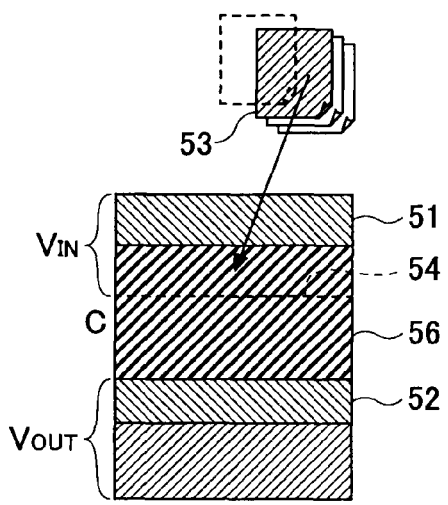

Embodiments will now be described with reference to the accompanying drawings, wherein like reference numerals designate corresponding or identical elements throughout the various drawings.

Figure 3:
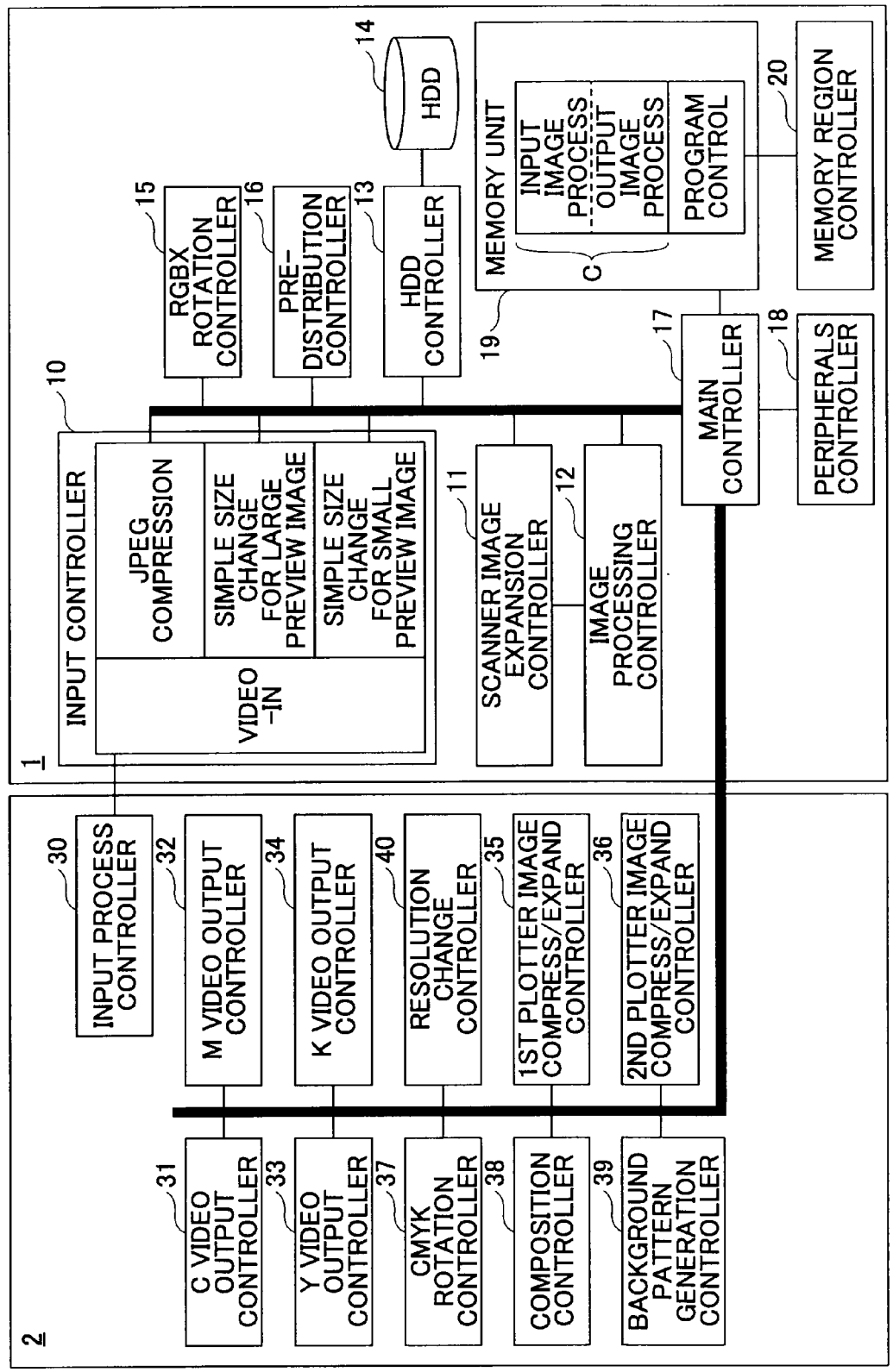
FIG. 3 shows a block diagram of an image processing apparatus according to an embodiment of the present invention.

FIG. 3 shows a block diagram of an image processing apparatus according to an embodiment of the present invention. The image processing apparatus, which may include a copy machine, a printing apparatus, a facsimile apparatus, or a multifunctional peripheral, includes a controller portion 1 and an engine portion 2.

In the controller portion 1, processed image data is handled as RGB image data for data compatibility with an external computer or the like. Various units in the controller portion 1 are described below.

An input controller 10 includes a video-in portion, a JPEG compressing portion, a simple size-change portion for large preview image, and a simple size-change portion for small preview image. Image data inputted via the video-in portion is compressed by the JPEG compressing portion in a JPEG format (JPEG compression) to obtain compressed image data.

The simple size-change portion for large preview image generates large preview image data from the image data inputted via the video-in portion. The simple size-change portion for small preview image generates small preview image data, also from the image data inputted via the video-in portion.

A scanner image expansion controller 11 is configured to expand the JPEG-compressed image data. An image processing controller 12 is configured to perform image editing, image correction, and color conversion (between RGB and CMYK), depending on the image data output destination. A hard disk drive (HDD) controller 13 controls writing and reading of various data including image data to or from a hard disk drive (HDD) 14.

An RGBX rotation controller 15 rotates distributed image data, the large preview image data, or the small preview image data. A pre-distribution process controller 16 may convert image data for mail transmission. A main controller (XBAR) 17 includes a central processing unit (CPU) for controlling the image processing apparatus as a whole.

A peripherals controller 18 controls the exchange of data with peripheral devices, such as a universal serial bus (USB) memory or a card reader. The peripherals controller 18 may also control the exchange of data with a computer connected to the image processing apparatus.

A memory unit 19 is a storage device configured to temporarily store various data including image data. A memory region controller 20 controls the allocation, releasing, writing, and reading of regions in the memory unit 19.

The engine portion 2 controls a plotter (printing unit) and a scanner (image reading unit), both of which are not shown. The engine portion 2 handles image data as CMYK image data in order to allow the data to be printed by the plotter.

Various units in the engine portion 2 are described below.

An input process controller 30 outputs image data read by the scanner (not shown) to the input controller 10 in the controller portion 1.

A cyan (C) video output controller 31 outputs C image data inputted via the controller portion 1 to the plotter. A magenta (M) video output controller 32 outputs M image data inputted via the controller portion 1 to the plotter. A yellow (Y) video output controller 33 outputs Y image data inputted via the controller portion 1 to the plotter. A black (K) video output controller 34 outputs K image data inputted via the controller portion 1 to the plotter.

Each of the C, M, Y, and K video output controllers 31 to 34 may include an additional function of composing a CMYK stamp image and a background pattern (unauthorized copy guard pattern), and of obtaining an engine resolution.

A first plotter image compression/expansion controller 35 and a second plotter image compression/expansion controller 36 both perform compression and expansion of CMYK image data.

A CMYK rotation controller 37 is configured to rotate CMYK image data. A composition controller 38 is configured to compose image data of any of the CMYK planes and a CMYK stamp image. This process is performed to superpose a fixed stamp or a barcode.

A background pattern generation controller 39 generates image data for the background pattern (unauthorized copy guard pattern). A resolution conversion controller 40 converts image data that may include low-resolution FAX-received image data into image data with a printable engine resolution.

Hereafter, control processes performed by the memory region controller 20 for reading or writing image data from or into the memory unit 19 are described.

<Sequential Region Releasing Control Process>

Hereafter, a sequential region releasing control process is described with reference to FIGS. 4A and 4B. In the sequential region releasing control process, unnecessary area of a pre-secured memory region is sequentially released depending on the amount of data that is inputted or outputted, so that better utilization of the regions in the memory unit 19 can be achieved.

The memory unit 19 is a storage unit for storing image data. The memory unit 19 has a common region which may be partitioned into an input image processing region ($V_{IN}$) and an output image processing region ($V_{OUT}$). Initially, there is no division between the input image processing region $V_{IN}$ and the output image processing region $V_{OUT}$.

The input image processing region $V_{IN}$ provides an input image data storage region for each of the scanner (image reader), copy, and printer functions. In the input image processing region $V_{IN}$, image data that is compressed at a preset compression ratio is stored. The output image processing region $V_{OUT}$ provides an output image data storage region for each of the functions, in which the image data stored in the input image processing region is temporarily stored for output after sequential expansion.

Figure 4A:
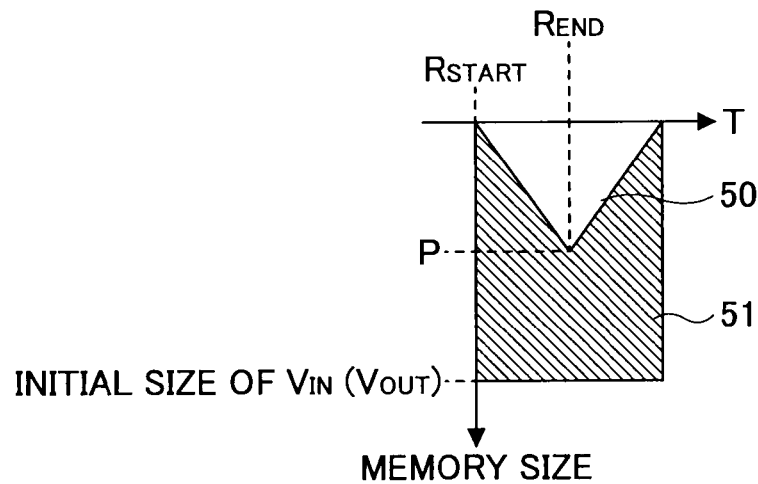
FIGS. 4A and 4B show diagrams illustrating a sequential region releasing control process performed by a memory region controller with respect to a memory unit.
Figure 4B:
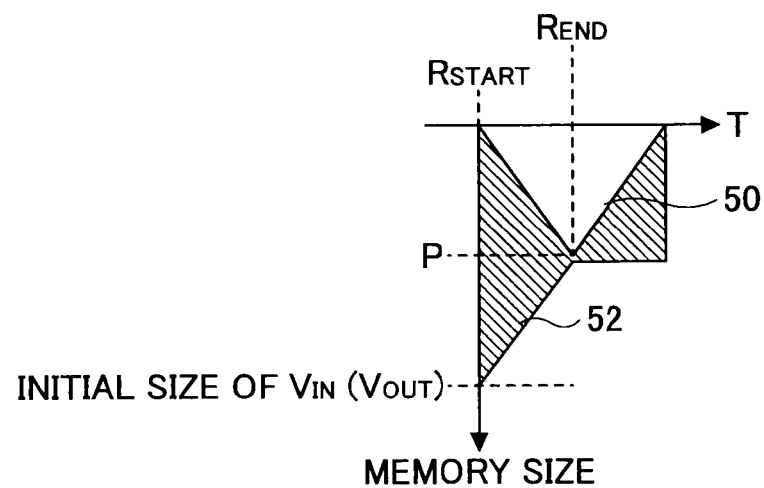

Referring to FIGS. 4A and 4B, the vertical axis shows the size of memory in the memory unit 19, and the horizontal axis shows the elapsed time (T).

First, the memory region controller 20, prior to the input of image data that is sequentially sent from the input process controller 30, sets in the memory unit 19 the common region combining a size of the input image processing region that is necessary for the storage of the sequentially inputted image data that is compressed at a preset minimum compression ratio, and a size of the output image processing region necessary for temporary storage of the image data that is sequentially expanded and stored in the input image storing region for output. A program control region for execution of a program is separately secured.

Referring to FIG. 4A, once the reading of a manuscript image is started by the scanner function from an image read start point $R_{START}$, the image data that is read is compressed by the input controller 10 and then sent to the memory unit 19 via the main controller 17. As a result, input image data 50 is accumulated in the input image processing region $V_{IN}$ in the common region. As the accumulation continues, the compressed image data in the input image processing region $V_{IN}$ is expanded and stored in the output image processing region. Thus, the input image data 50 for one page, for example, reaches a peak value P, i.e., a maximum accumulated amount, at an image read end point $R_{END}$, after which the amount of the accumulated image data gradually decreases.

When the compression ratio of the input image data 50 is relatively high, the storage of the input image data 50 may require only one half the initial size of the input image processing region that is set by the memory region controller 20. In this case, some of the memory area in the common memory region is wasted, as indicated at 51.

Thus, the memory region controller 20 predicts, following the start of the sequential input of image data, an excess amount of the storage size that is set in the input image processing region based on the compression ratio of the image data that is sequentially inputted.

Referring to FIG. 4B, the predicted excess amount is sequentially released from the initially secured memory size in the input image processing region $V_{IN}$, so that the allocated amount of the input image processing region $V_{IN}$ reaches the peak value (P) of the image data 50 at the image read end point $R_{END}$. The allocated size of the input image processing region at the image read end point $R_{END}$ may be increased a little so that an unexpected increase in the peak image data amount can be accommodated. The thus released memory area may be utilized for a different purpose.

While the foregoing description has been concerned with the region releasing control for the input image processing region, the same principle applies to the output image processing region $V_{OUT}$.

In this way, a memory size is initially secured on the assumption of a low compression ratio. An excess size is released in the light of the compression ratio of the image data that is being inputted (or outputted). Thus, the invasion of a separate region by image data with a low compression ratio can be prevented, thereby allowing an efficient utilization of the regions in the memory unit. For example, a region for subsequent image data can be secured more readily.

<Sequential Region Adding Control Process>

Hereafter, a sequential region adding control process is described with reference to FIGS. 5A and 5B. In the sequential region adding control process, any lack of a pre-secured memory size relative to the amount of image data that is inputted or outputted is compensated by adding a memory area from a region that has been released, so that the invasion of a memory region by image data can be prevented.

First, the memory region controller 20 sets a common region in the memory unit 19 prior to the input of image data that is sequentially inputted from the input process controller 30. The common region combines a size of the input image processing region necessary for storing the sequentially inputted image data that is compressed at a preset standard compression ratio, and a size of the output image processing region necessary for temporary storage of the image data stored in the input image processing region that is sequentially expanded and outputted. A program control region used for executing a program is separately secured.

For example, when a plurality of manuscript sheets are successively read and printed, the memory region controller 20 secures, upon starting of the reading of an image, the output image processing region $V_{OUT}$ for the printing operation. Once the input of image data starts, the memory region controller 20 predicts a size of storage area that will be lacking in the size of storage area that has been set in the input image processing region, based on the compression ratio of the image data being inputted.

Figure 5A:
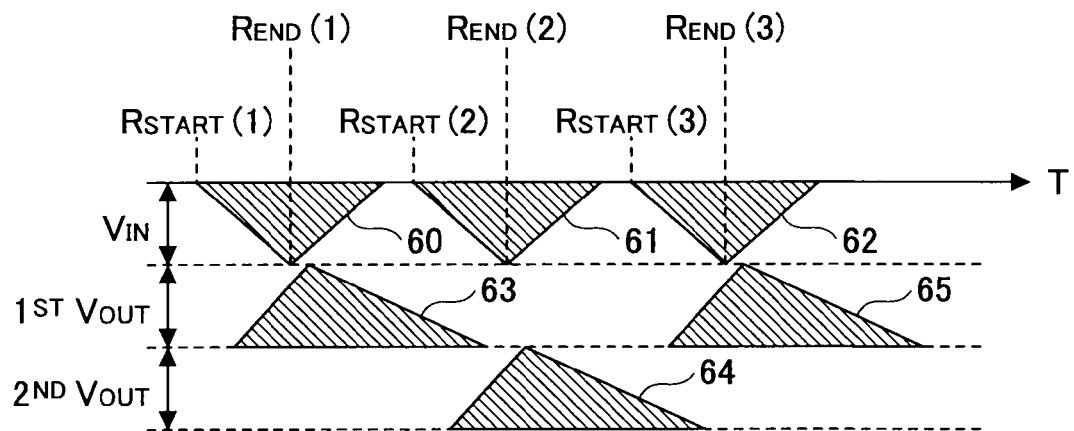
FIGS. 5A and 5B show diagrams illustrating a sequential region adding control process performed by the memory region controller.

If there is no lack in storage size, compressed image data 60 for page 1 is accumulated within the size of the input image processing region $V_{IN}$, as shown in FIG. 5A. The image data is then accumulated within the size of the first output image processing region ($1st V_{OUT}$) as image data 63 for page 1 after expansion and restoration. The image data 63 is then sequentially transferred to the engine portion 2 for printing. The size of the first output image processing region $1st V_{OUT}$ that has been used is then released.

At the end of reading of the image for page 1, reading of an image for page 2 starts. Because the speed of reading an image is faster than the speed of printing the image, the first output image processing region 1st $V_{OUT}$ in which the image data 63 for page 1 is accumulated is not yet released when the reading of the image for page 2 starts. Thus, the memory region controller 20 newly secures a second output image processing region 2nd $V_{OUT}$ in the common region, and stores the image data 64 for page 2 in the second output image processing region. As described above, the memory region controller 20 predicts a size of storage area that will be lacking in the size that is set in the input image processing region. If there is no lack, the image data 64 for page 2 is accumulated within the size of the newly secured second output image processing region 2nd $V_{OUT}$.

At the end of the reading of the image for page 2, reading of an image for page 3 starts. Because at this point in time the first output image processing region 1st $V_{OUT}$ in which the image data 63 for page 1 has been accumulated is released, the memory region controller 20 reuses the first output image processing region 1st $V_{OUT}$ as a region for accumulating the image data 65 for page 3. In this case, too, the memory region controller 20 predicts a size of storage area that will be lacking in the size set in the input image processing region $V_{IN}$. If there is no lack in memory size, the image data 65 for page 3 is accumulated in the first output image processing region 1st $V_{OUT}$.

The above process is repeated for page 4 and any subsequent pages.

Figure 5B:
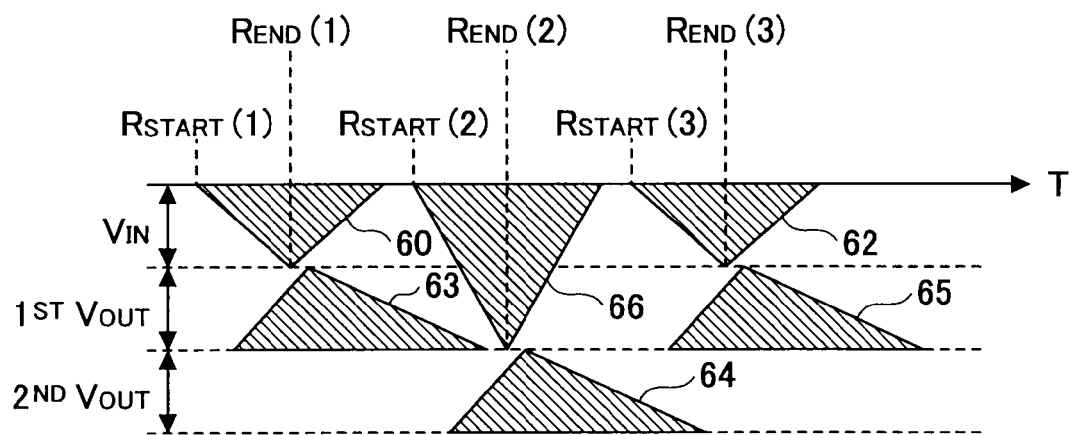

On the other hand, when the image data for page 2 that is read is compressed at a low compression ratio, as shown in FIG. 5B, the initially secured size of the input image processing region $V_{IN}$ may be lacking. Thus, the memory region controller 20 predicts, following the start of the input of the image data for page 2, a lacking amount in the size that is set in the input image processing region $V_{IN}$ based on the compression ratio of the image data for page 2. The memory region controller 20 then adds the lacking amount to the input image processing region $V_{IN}$ from the first output image processing region 1st $V_{OUT}$ from which the image data 63 for page 1 has been outputted, and accumulates the image data 66 in the input image processing region $V_{IN}$ with the increased storage size.

Thus, a region for the standard compression image data is initially ensured, and an additional memory space is sequentially ensured when the input image data has a low compression ratio. In this way, the invasion of a separate region by the image data with the low compression ratio can be prevented.

<Data Compression Method Switching Control Process>

Hereafter, a data compression method switching control process is described with reference to FIG. 6. In the data compression method switching control process, following the start of the sequential input of image data, it is determined whether the image data has a compression ratio lower than a standard compression ratio. If it is determined that the compression ratio of the image data is lower than the standard compression ratio, the image data is compressed at a compression ratio higher than the standard compression ratio in order to prevent the invasion of a separate region by the image data with the low compression ratio.

As in the process described with reference to FIGS. 5A and 5B, input and output of image data is performed. If it is determined that, at a point in time indicated by an arrow A in FIG. 6, that the image data 67 for page 2 that is being read has a compression ratio lower than the standard compression ratio, the memory region controller 20 instructs the input controller 10 to compress the image data 67 at a compression ratio higher than the standard compression ratio.

Figure 6:
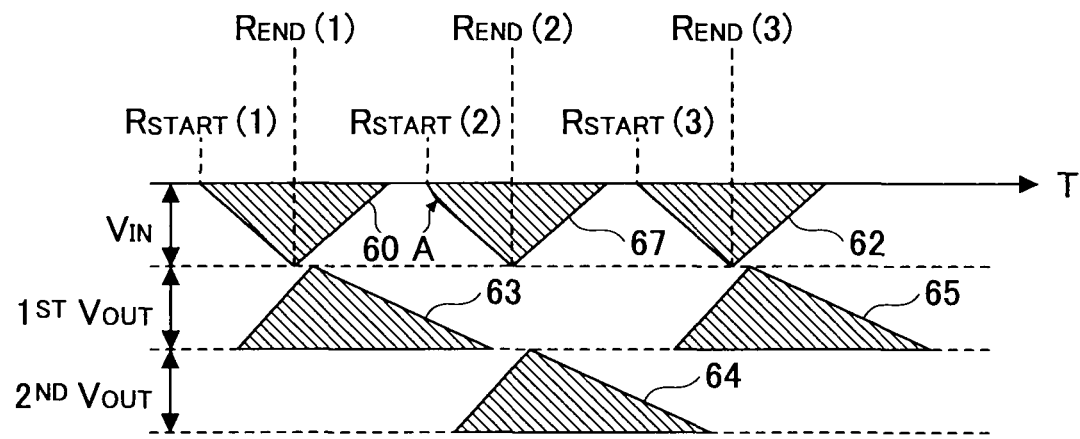
FIG. 6 shows a diagram illustrating a data compression method switching control process performed by the memory region controller when writing image data into the memory unit.

In the example shown in FIG. 6, the image data 67 successfully fits within the preset size of the input image processing region $V_{IN}$ because of the change in compression ratio. However, if it is determined that the storage region still lacks even after the compression ratio is changed, the sequential region adding control process described earlier may be performed.

In this way, when the initial image data size for the standard compression ratio is lacking in view of the compression ratio of the image data that is being inputted, the compression ratio of the image data is changed to a higher compression ratio during the input of the image data. For example, when it is determined that the low compression ratio is by an existing general-purpose compression method, such as JPEG, the compression method is switched to a method with a higher compression ratio specifically adapted to the apparatus. Thus, the invasion of a separate region by the image data with a low compression ratio can be prevented.

<Region Linkage Cancelling Control Process>

Figure 7:
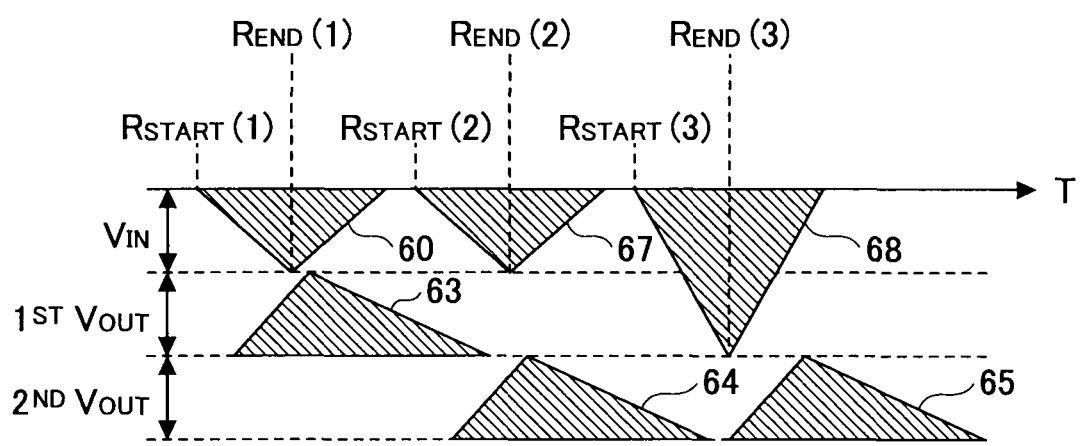
FIG. 7 shows a diagram illustrating a region linkage cancelling control process performed by the memory region controller.

Hereafter, a region linkage cancelling control process is described with reference to FIG. 7. In the region linkage cancelling control process, based on the compression ratio of image data that is sequentially inputted, an excess portion of the output image processing region that is set in the common region is additionally allocated to the input image processing region when the storage amount set in the input image processing region is lacking.

As in the process described with reference to FIGS. 5A and 5B, input and output of image data are performed. When the image data for page 3 that is read has a low compression ratio, the input image processing region $V_{IN}$ may be lacking. When this is the case, the memory region controller 20 cancels the use of the first output image processing region 1st $V_{OUT}$ when the image data 64 for page 2 is being printed, for example, thus canceling the linkage between the reading process and the printing process.

The first output image processing region 1st $V_{OUT}$ that is released is then converted into the input image processing region $V_{IN}$ where the image data 68 for page 3 is accumulated. By the time the reading of the image for page 3 is over, the second output image processing region that has been used for accumulating the image data 64 for page 2 is released. Thus, the second output image processing region is used for accumulating the image data 65 for page 3.

For pages 1 and 2, there are enough regions for synchronizing input and output; thus, a linked operation control can be performed using hardware. However, for page 3, there is only ensured the input image processing region and the output image processing region is not ensured for synchronization. Thus, the linked control by hardware is cancelled and switched over to control by the memory region controller 20, so that a control standby time can be reduced.

In this way, the duration of a process standby status can be minimized and improved productivity can be achieved.

<Compulsory Terminating Control Process>

Hereafter, a compulsory terminating control process is described with reference to FIG. 8. In the compulsory terminating control process, the common region of the memory unit 19 is shared by the plural functions for scanning (image reading), copying, and printing, where the memory region controller 20 sets an order of use of the common region in accordance with a priority order that is set for each of the functions. When the common region is being used by one of the functions, upon instruction for executing another one of the functions that has higher priority than the function that is currently occupying the common region, the memory region controller 20 suspends the use of the common region by the currently implemented function and allocates the common region to the function with higher priority.

Figure 8:
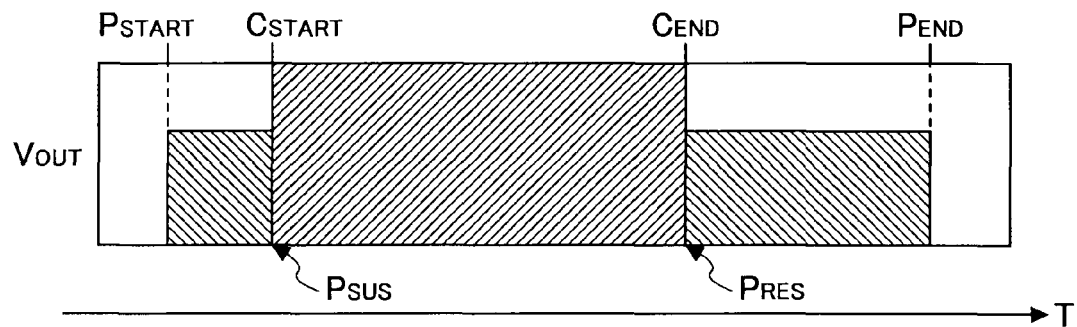
FIG. 8 shows a diagram illustrating a compulsory terminating control process performed by the memory region controller when writing image data into the memory unit.

In FIG. 8, the horizontal axis shows the elapsed time T.

For example, it is assumed that the copy function has higher priority than the print function. Upon reception of an instruction to execute the print function, the memory region controller 20 ensures a memory size in the output image processing region for the image data to be printed. Thus, the image data is accumulated in the output image processing region from the print start point.

It is further assumed that, during the processing of the print function, execution of the copy function is instructed. The memory region controller 20 then suspends the printing process at a print suspended point $P_{SUS}$. The memory region controller 20 then releases the output image processing region $V_{OUT}$ that has been ensured for the print function, and ensures the released region for the copy function at a copy start point $C_{START}$. When the copy function is implemented, the output image processing region is used for the copy function up to a copy end point $C_{END}$.

At the end of the process of the copy function, the print function that has been suspended is resumed at $P_{RES}$. Specifically, the memory region controller 20 ensures the output image processing region $V_{OUT}$ for the print function again, performs the print process from the print resuming point $P_{RES}$ to a print end point $P_{END}$, and releases the output image processing region $V_{OUT}$ at the end of the print process.

Thus, a print process in the background is suspended upon starting of a copy process in the foreground, the copy process in the foreground is performed, and the background print process is resumed at the end of the foreground copy process.

In this way, the copy function as a direct operation can be processed with priority over the print function as a background process, for example.

<Region Saving Control Process>

Figure 9:
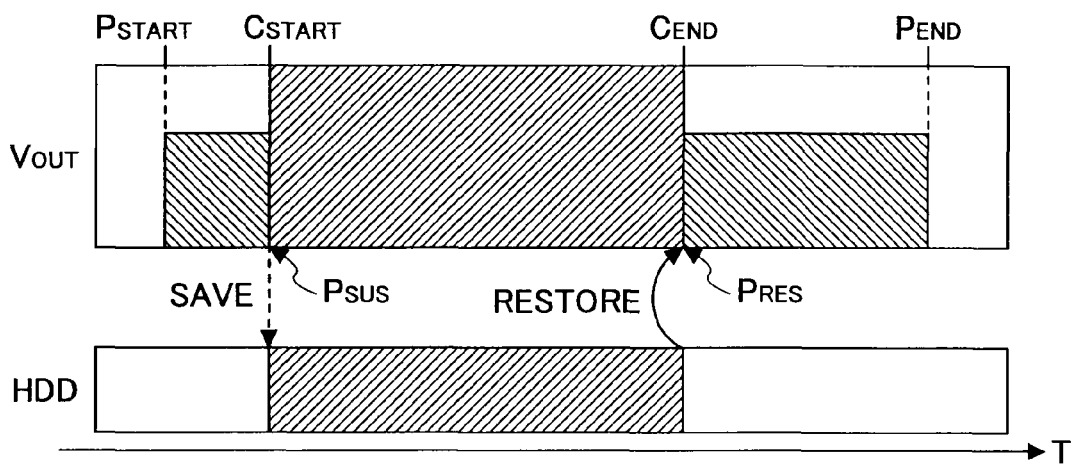
FIG. 9 shows a diagram illustrating a region saving control process performed by the memory region controller.

Hereafter, a region saving control process is described with reference to FIG. 9. In the region saving control process, when an earlier use of the common region by a function is suspended, the memory region controller 20 ensures a region in a storage unit other than the memory unit 19, such as the HDD 14, and allows the separate storage unit to be temporarily used by the earlier-implemented function.

Assume that the copy function has higher priority than the print function. The memory region controller 20, upon reception of an instruction for performing the print function, ensures a region in the output image processing region $V_{OUT}$ for the image data to be printed by the print function. Thus, the image data is accumulated in the output image processing region $V_{OUT}$ from a print start point $P_{START}$.

Upon reception of an instruction for implementing the copy function while the print function is being processed, the memory region controller 20 suspends the printing process at a print suspended point $P_{SUS}$, and saves the region ensured for the print function into the HDD 14 via the HDD controller unit 13, so that a region is ensured in the HDD 14 whose temporary use is allowed to the print function for continuously storing the image data for output to the engine portion 2. The memory region controller 20 then releases the output image processing region $V_{OUT}$ and ensures the released region for the copy function. Thus, upon execution of the copy function, the output image processing region $V_{OUT}$ is used by the copy function up to a copy end point $C_{END}$.

At the end of the copy function process at $C_{END}$, the print function that has been suspended is resumed at $P_{RES}$. Specifically, the memory region controller 20 returns the region for the print function that has been saved in the HDD 14 to the output image processing region $V_{OUT}$, and ensures the output image processing region $V_{OUT}$ for the print function again from the print process resuming point $P_{RES}$. Thus, the print function is performed from the print process resuming point $P_{RES}$ to a print end point $P_{END}$; at the end of printing, the output image processing region $V_{OUT}$ is released.

Thus, when the copy process is started as a foreground process, the background print process is suspended, the region for the print process is once saved in the HDD, and the foreground copy process is implemented in the output image processing region $V_{OUT}$. At the end of the foreground copy process, the region for printing in the background process is returned to the output image processing region $V_{OUT}$, so that the background print process can be continued.

<Wait Control Process>

Figure 10:
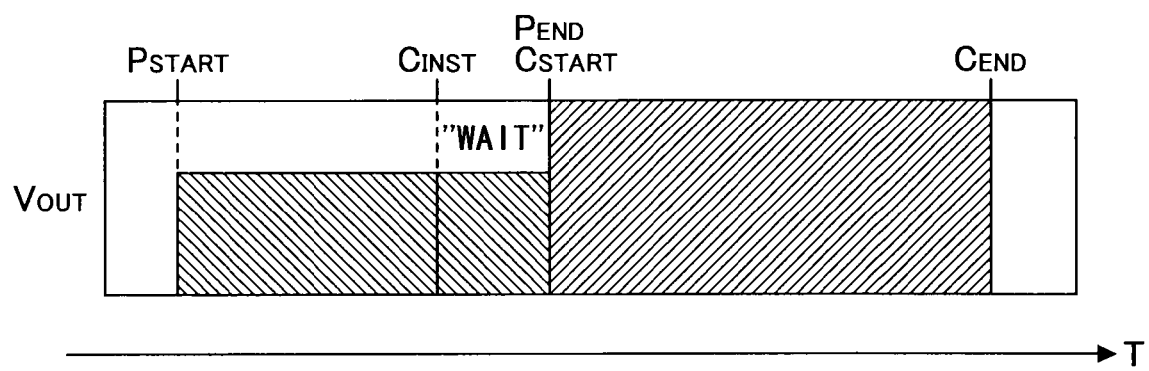
FIG. 10 shows a diagram illustrating a wait control process performed by the memory region controller when writing image data into the memory unit.

Hereafter, a wait control process is described with reference to FIG. 10. In the wait control process, a foreground process that is instructed is kept waiting until a background process ends, and a user is notified of the wait status.

Upon reception of an instruction for the print function, the memory region controller 20 ensures a region in the output image processing region $V_{OUT}$ for the image data to be printed by the print function. Thus, the image data is accumulated in the output image processing region $V_{OUT}$ from a print start point $P_{START}$.

During the process of the print function, in response to an instruction for the copy function, the memory region controller 20 keeps the copy function waiting, and lets the print function use the output image processing region $V_{OUT}$ continuously. At the same time, the memory region controller 20 causes an operating/display unit (not shown) to display a message to the effect that copying will wait from a copy start instructed point $C_{INST}$ until a print end point $P_{END}$.

At the print end point $P_{END}$, the memory region controller 20 releases the output image processing region $V_{OUT}$ and ensures the output image processing region $V_{OUT}$ for the copy function. Thus, the output image processing region $V_{OUT}$ is used by the copy function between the copy start point $C_{START}$ and the copy end point $C_{END}$, whereby copying is performed.

Thus, when the print process in the background is nearing its end, the background print process is continued and the foreground copy process is kept waiting a little while. Until the background print process ends, which is before long, the message is displayed on the operating/display screen to thus notify the user of a wait status.

<Background Process Saving Control Process>

Figure 11:
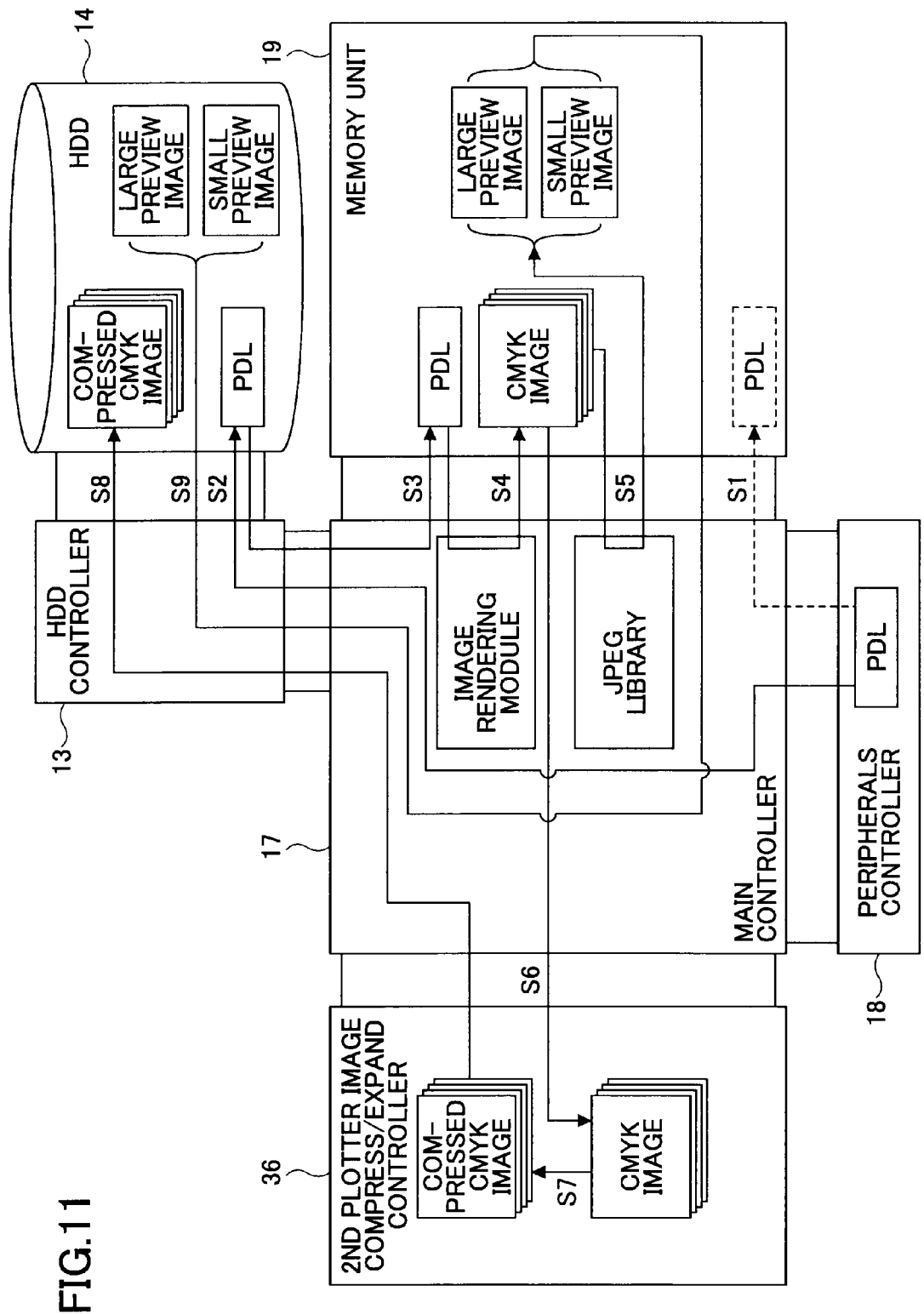
FIG. 11 shows a diagram illustrating a background process saving control process performed in the image processing apparatus shown in FIG. 1.

Hereafter, a background process saving control process is described with reference to FIG. 11.

It is assumed that no foreground process is going on in the image processing apparatus shown in FIG. 3, such as when neither the copy nor the scanner function is used by an operation by a user. In this case, image data (PDL) to be printed that is received by the peripherals controller 18 is once accumulated in the memory unit 19 via the main controller 17 in step 1 ("S1" in the drawing). Thereafter, the PDL image data is sent to the engine portion in order to perform the printing process.

On the other hand, when a foreground process is being performed, such as when the copy or scanner function is being used by an operation by the user, the image data (PDL) to be printed that is received by the peripherals controller 18 is once accumulated in the HDD 14 via the main controller 17 and the HDD controller unit 13, in step S2.

In step S3, the PDL data accumulated in the HDD 14 is read and accumulated in the memory unit 19.

In step S4, the PDL data is converted by an image rendering module in the main controller 17 into CMYK image data, which is accumulated in the memory unit 19 again.

In step S5, the CMYK image data is subjected to a size-reducing or increasing process and an encoding process to generate large preview image data and small preview image data, which are then accumulated in the memory unit 19.

In step S6, the CMYK image data in the memory unit 19 is sent to the second plotter image compression/expansion controller 36 in the engine portion for image data to be printed via the main controller 17.

In step S7, the second plotter image compression/expansion controller 36 compresses the CMYK image data, creating compressed CMYK image data.

In step 8B, the compressed CMYK image data is accumulated in the HDD 14 via the main controller 17 and the HDD controller unit 13.

In step S9, the large preview image data and the small preview image data in the memory unit 19 are accumulated in the HDD 14 via the main controller 17 and the HDD controller unit 13.

Thereafter, at the end of the foreground process, the CMYK image data that has been stored in the HDD 14 is sent to the engine portion in order to perform the printing process.

For the normal background process, the process proceeds via the memory unit 19. However, when a foreground process is going on and a region cannot be ensured in the memory unit 19, the image data is once saved in the HDD 14. Upon establishment of a region in the memory unit 19, the image data saved in the HDD 14 is processed.

In this way, the output image processing region that has been used for the background process can be compulsorily released for the foreground process. Thus, the duration of a wait status in response to a user operation can be minimized and improved productivity can be achieved.

The image processing apparatus according to an embodiment of the present invention may include a copy machine, a printing apparatus, a facsimile apparatus, a multifunctional peripheral, or any other apparatus that handles image data.

Although this invention has been described in detail with reference to certain embodiments, variations and modifications exist within the scope and spirit of the invention as described and defined in the following claims.

The present application is based on the Japanese Priority Application No. 2008-069201 filed Mar. 18, 2008, the entire contents of which are hereby incorporated by reference.

What is claimed is:

1. An image processing apparatus comprising:
a storage unit configured to store image data; and
a control unit configured to ensure a common region in the storage unit, the common region including an input image data storage region and an output image data storage region,
wherein the image data that is compressed at a preset compression ratio and sequentially inputted is stored in the input image data storage region, and the image data stored in the input image data storage region is sequentially expanded and temporarily stored in the output image data storage region for output,
wherein the control unit is also configured to control allocation of the input image data storage region and the output image data storage region in the common region, by sequentially releasing a predicted excess memory amount from an initial memory size of either the input image data storage region or the output image data storage region,
wherein, in response to reading and printing of the image data, the control unit is configured to
allocate the output image processing region for printing, upon starting of the reading of the image data, and
allocate, after start of the sequential input of the image data, a portion of the output image data storage region to the input image data storage region to accumulate the image data, in response to the initial memory size of the input image data storage region being of an insufficient size, and
wherein initially, there is no division between the input image data storage region and the output image data storage region of the common region prior to starting the sequential input of the image data.

2. The image processing apparatus according to claim 1, wherein the control unit is configured to set, before the start of the sequential input of the image data, the initial memory size of the input image data storage region in the common region that is required for storing the image data that is sequentially inputted when the image data is compressed at a preset minimum compression ratio,
wherein the control unit is further configured to predict, after the start of the sequential input of the image data, the predicted excess memory amount of the initial memory size set in the input image data storage region based on the compression ratio of the image data that is sequentially inputted, and to release the predicted excess memory amount from the initial memory size set in the input image data storage region.

3. The image processing apparatus according to claim 1, wherein the control unit is configured to set, before the start of the sequential input of the image data, the initial memory size of the input image data storage region in the common region that is required for storing the sequentially inputted image data when the image data is compressed at a preset standard compression ratio,
wherein the control unit is further configured to predict, after the start of the sequential input of the image data, an amount of storage that is lacking in the amount set in the input image data storage region based on the compression ratio of the sequentially inputted image data, and to add the predicted lacking amount to the initial memory size set in the input image data storage region, when an amount of storage is lacking.

4. The image processing apparatus according to claim 1, wherein, after the start of the sequential input of the image data, when the control unit determines that the compression ratio of the sequentially inputted image data is lower than a standard compression ratio, the control unit causes the sequentially inputted image data to be compressed at a compression ratio higher than the standard compression ratio.

5. The image processing apparatus according to claim 1, wherein, before the start of the sequential input of the image data, the control unit is further configured to set in the common region the initial memory size of the input image data storage region that is required for storing the sequentially inputted image data when the image data is compressed at a preset standard compression ratio,
wherein, after the start of the sequential input of the image data, the control unit is further configured to predict whether the initial memory size set in the input image data storage region is lacking based on the compression ratio of the sequentially inputted image data,
wherein the control unit, when it is predicted that the initial memory size set in the input image data storage region is lacking, is further configured to additionally allocate an excess portion of the output image data storage region set in the common region to the input image data storage region.

6. The image processing apparatus according to claim 1, wherein the common region is shared by plural functions including an image reading function, a copy function, and a print function, wherein the control unit determines an order of use of the common region based on a priority order that is set for each of the plural functions in advance, wherein, when the common region is being used by one of the plural functions, the control unit suspends the use of the common region by the function that currently uses the common region and allows the common region to be used by another one of the functions that has a higher priority order than the current function, in response to an instruction for performing the function having the higher priority order.

7. The image processing apparatus according to claim 6, wherein, when suspending the use of the common region by the current function, the control unit ensures a region in a separate storage unit and allows the current function to use the separate storage unit temporarily.

8. The image processing apparatus according to claim 6, wherein, when the use of the common region by the current function is suspended, the control unit notifies a user of the image processing apparatus.

9. The image processing apparatus according to claim 1, wherein the predicted excess memory amount that is released by the control unit is available to be utilized for subsequent image data.

10. An image processing method comprising:
storing image data in a storage unit;
ensuring a common region in the storage unit, the common region including an input image data storage region and an output image data storage region;
sequentially storing the image data that is compressed at a preset compression ratio and sequentially inputted in the input image data storage region;
sequentially expanding the image data stored in the input image data storage region;
temporarily storing the expanded image data in the output image data storage region;
controlling allocation of the input image data storage region and the output image data storage region in the common region, by sequentially releasing a predicted excess memory amount from an initial memory size of either the input image data storage region or the output image data storage region;
in response to reading and printing of the image data,
allocating the output image processing region for printing, upon starting of the reading of the image data, and
allocating, after start of the sequential input of the image data, a portion of the output image data storage region to the input image data storage region to accumulate the image data, in response to the initial memory size of the input image data storage region being of an insufficient size; and
providing, prior to starting the sequential input of the image data, initially no division between the input image data storage region and the output image data storage region of the common region.

11. The image processing method according to claim 10, further comprising:
setting, before the start of the sequential input of the image data, the initial memory size of the input image data storage region in the common region that is required for storing the image data that is sequentially inputted when the image data is compressed at a preset minimum compression ratio;
predicting, after the start of the sequential input of the image data, the predicted excess memory amount of the initial memory size set in the input image data storage region based on the compression ratio of the image data that is sequentially inputted; and
releasing the predicted excess portion from the initial memory size set in the input image data storage region.

12. The image processing method according to claim 10, further comprising:
setting, before the start of the sequential input of the image data, the initial memory size of the input image data storage region in the common region that is required for storing the sequentially inputted image data when the image data is compressed at a preset standard compression ratio;
predicting, after the start of the sequential input of the image data, an amount of storage that is lacking in the amount set in the input image data storage region based on the compression ratio of the sequentially inputted image data; and
adding the predicted lacking amount to the initial memory size set in the input image data storage region, when an amount of storage is lacking.

13. The image processing method according to claim 10, further comprising:
determining that the compression ratio of the sequentially inputted image data is lower than a standard compression ratio after the start of the sequential input of the image data; and
compressing the sequentially inputted image data at a compression ratio higher than the standard compression ratio.

14. The image processing method according to claim 10, further comprising:
setting in the common region the initial memory size of the input image data storage region that is required for storing the sequentially inputted image data when the image data is compressed at a preset standard compression ratio before the start of the sequential input of the image data;
predicting whether the initial memory size set in the input image data storage region is lacking based on the compression ratio of the sequentially inputted image data after the start of the sequential input of the image data; and
additionally allocating an excess portion of the output image data storage region set in the common region to the input image data storage region when it is predicted that the initial memory size set in the input image data storage region is lacking.

15. The image processing method according to claim 10, further comprising:
providing the common region to be shared by plural functions including an image reading function, a copy function, and a print function;
determining an order of use of the common region based on a priority order that is set for each of the plural functions in advance; and
when the common region is being used by one of the plural functions, suspending the use of the common region by the function that currently uses the common region and allowing the common region to be used by another one of the functions that has a higher priority order than the current function, in response to an instruction for performing the function having the higher priority order.

16. The image processing method according to claim 15, further comprising ensuring a region in a separate storage unit and allowing the current function to use the separate storage unit temporarily, when suspending the use of the common region by the current function.

17. The image processing method according to claim 15, further comprising notifying a user of an image processing apparatus when the use of the common region by the current function is suspended, the image processing apparatus including the storage unit.

\* \* \* \* \*